US008629864B2

(12) United States Patent
Miwa et al.

(10) Patent No.: US 8,629,864 B2

(45) Date of Patent: Jan. 14, 2014

(54) DISPLAY DEVICE AND PIXEL CIRCUIT

(75) Inventors: Koichi Miwa, Tokyo (JP); Yuichi Maekawa, Tokyo (JP)

(73) Assignee: Global OLED Technology LLC, Wilmington, DE (US)

(*) Notice: Subject to any disclaimer, the term of this patent is extended or adjusted under 35 U.S.C. 154(b) by 665 days.

(21) Appl. No.: 12/738,824

(22) PCT Filed: Oct. 8, 2008

(86) PCT No.: PCT/US2008/011582

§ 371 (c)(1), (2), (4) Date: Jun. 2, 2010

(87) PCT Pub. No.: WO2009/051651

PCT Pub. Date: Apr. 23, 2009

(65) Prior Publication Data

US 2010/0277455 A1 Nov. 4, 2010

(30) Foreign Application Priority Data

Oct. 19, 2007 (JP) ................................ 2007-271975

(51) Int. Cl.

*G06F 3/038* (2013.01)
*G09G 5/00* (2006.01)
*G09G 3/30* (2006.01)

(52) U.S. Cl.

USPC ................ 345/211; 345/76; 345/77; 345/204

(58) Field of Classification Search

USPC ..................................... 345/76–77, 204, 211

See application file for complete search history.

(56) References Cited

U.S. PATENT DOCUMENTS

| | | | | |
|---|---|---|---|---|
| 6,577,302 | B2 * | 6/2003 | Hunter et al. | 345/204 |
| 6,753,834 | B2 * | 6/2004 | Mikami et al. | 345/76 |
| 7,528,809 | B2 * | 5/2009 | Sim | 345/76 |
| 7,545,347 | B2 * | 6/2009 | Kanda | 345/76 |
| 7,609,234 | B2 * | 10/2009 | Cho et al. | 345/76 |
| 7,995,008 | B2 * | 8/2011 | Miwa | 345/76 |
| 2001/0026251 | A1 | 10/2001 | Hunter et al. | |
| 2002/0047839 | A1 * | 4/2002 | Kasai | 345/211 |
| 2006/0290617 | A1 * | 12/2006 | Miyazawa | 345/76 |
| 2007/0128583 | A1 * | 6/2007 | Miyazawa | 434/433 |

FOREIGN PATENT DOCUMENTS

| | | |
|---|---|---|
| EP | 1 191 512 A | 3/2002 |
| JP | 2006-300980 | 11/2006 |
| JP | 2007-241302 | 9/2007 |

* cited by examiner

*Primary Examiner* — Bipin Shalwala
*Assistant Examiner* — Benyam Ketema
(74) *Attorney, Agent, or Firm* — McKenna Long & Aldridge, LLP

(57) ABSTRACT

A display device in which a plurality of pixels are arranged in a matrix form, corresponding to intersections of a plurality of data lines and a plurality of scan lines, wherein each pixel includes a light emitting element having a first electrode connected to a first power supply and which emits light according to a current that flows; a driving transistor having a source electrode connected to a second power supply and which supplies a drain current to a second electrode of the light emitting element; a data storage capacitor having a first electrode connected to a gate electrode of the driving transistor; and a first switch which is switched ON during a pixel selection period so that data of a data line is written to the data storage capacitor, and wherein a potential of a second electrode of the data storage capacitor is changed.

10 Claims, 7 Drawing Sheets

DISPLAY DEVICE AND PIXEL CIRCUIT

This application is a National Stage Entry of International Application No. PCT/US2008/011582, filed Oct, 8, 2008, and claims the benefit of Japanese Application No. 2007-271975, filed on Oct. 19, 2007, which is hereby incorporated by reference for all purposes as if fully set forth herein.

FIELD OF THE INVENTION

The present invention relates to a display panel with pixels arranged in a matrix shape, and to a pixel circuit for such a display panel.

BACKGROUND OF THE INVENTION

With a display device that uses current drive type light emitting elements, such as an OLED, power supply lines are normally arranged inside a pixel region, driving elements and elements to be driven, such as the OLED, are connected between the power supply lines, and a desired display image is obtained by controlling the conductance of the driving elements. In the case of using a transistor as a drive element (driving transistor), the source terminal of that driving transistor is connected to one power supply, and by applying a voltage corresponding to display data to the gate terminal of the driving transistor a current corresponding to the voltage across the gate and source of the driving transistor is supplied to the OLED, being a driven element, and a desired display image is obtained.

FIG. 1 shows the overall structure of a display device of the related art. Unit pixels (pixels) 2 are arranged in a matrix shape in a pixel region 1. Scan lines 3 are arranged in correspondence with each row of pixels 2, and signal lines 4 and power supply lines 5 are provided in correspondence with each column of unit pixels 2. The scan lines 3 are driven by a scan line driving circuit 6, the signal lines 4 are driven by a signal line driving circuit 7, and the power supply lines 5 are driven by a power supply voltage circuit 8.

In response to signals from a control circuit 9 the scan line drive circuit 6 selects one scan line, and the signal line drive circuit 7 supplies a signal for the pixel being selected to the signal line 4. By repeating this, signals corresponding to each pixel are written. A power supply voltage is always supplied to the power supply lines 5.

FIG. 2A shows a representative pixel circuit for the case of a P-type transistor as the driving transistor. One end of a switch SW1 formed by a transistor is connected to the signal line 4, and the other end of the switch SW1 is connected to a gate terminal of a driving transistor $T_{DR}$. The source of the driving transistor $T_{DR}$ is connected to a power supply line 5 that supplies a power supply voltage Vdd. Here, the resistor $R_L$ is the wiring resistance of the power supply line 5. Also, a data holding capacitor Cs is connected between the source and gate of the driving transistor $T_{DR}$, and the drain of the driving transistor $T_{DR}$ is connected to an anode of an OLED. The cathode of the OLED is connected to ground etc., being a low voltage power supply.

As a result, a voltage corresponding to Vdd−Vdata is written to the data holding capacitor Cs by turning the switch SW1 on, a current corresponding to Vdata flows in the driving transistor $T_{DR}$, and the OLED emits light using that current.

If the current flowing in the power supply line 5 is large, variation arises in the power supply voltage Vdd due to the resistance of the power supply line 5. Since the voltage stored in the data holding capacitor Cs at this time is lowered, the emission brightness of the pixel is lower than the intended brightness. In order to deal with this type of problem, a conventional method has aimed to reduce variation in the voltage of the power supply line itself. In order to reduce voltage variation in the power supply line, it has been considered to lower the resistance of the power supply line itself (for example, JP 2007-241302), or to turn off the flow of current in the driving transistor in a pixel selection period (for example, U.S. Patent Application Publication No. 2007/0128583).

With the method of patent document 1 described above, there can be a limit to the lowering of the resistance value of the power supply line, which basically has no solution. Also, with the method of U.S. Patent Application Publication No. 2007/0128583, since the source electrode of the driving transistor is floating during the pixel selection period, it is difficult to accurately write a signal voltage across the gate and source of the driving transistor.

SUMMARY OF THE INVENTION

An object of the present invention is to provide a display device that suppresses variation in pixel current due to potential variation in a power supply voltage, and has good display characteristics.

The present invention is directed to a display device in which a plurality of pixels are arranged in a matrix form corresponding to intersections of a plurality of data lines and a plurality of scan lines, wherein each pixel includes a light emitting element having a first electrode connected to a first power supply and which emits light according to a current that flows in an element, a driving transistor having a source electrode connected to a second power supply and which supplies a drain current to a second electrode of the light emitting element, a data storage capacitor having a first electrode connected to a gate electrode of the driving transistor, and a first switch which is switched ON during a pixel selection period so that data of a data line is written to the data storage capacitor, and wherein a potential of a second electrode of the data storage capacitor is changed between at least a partial period in a pixel selection period and at least a partial period in a pixel non-selection period.

Also, it is preferable to further have a second switch for controlling connection between the second power supply and the second electrode of the data storage capacitor, and for the second electrode of the data storage capacitor and a reference power supply that is different from the second power supply to be connected via a resistance.

Also, if a resistance between the data storage capacitor and the reference power supply is made $R_{LR}$, an on resistance of the second switch is made Ron, and a number of pixels, in whichever of the horizontal or vertical direction of the display device has fewer pixels, is made M, to satisfy a relationship $Ron<R_{LR}\times M/40$.

Further, it is preferable to further have a second switch for controlling connection between the second power supply and the second electrode of the data storage capacitor, and to have a third switch for controlling connection between the second electrode of the data storage capacitor and a reference power supply that is different from the second power supply.

Also, if on resistance/off resistance, being a ratio of the on resistance to the off resistance of the second switch, is made R2, and on resistance/off resistance, being a ratio of the on resistance to the off resistance of the third switch, is made R3, it is preferable to satisfy a relationship $R2\times R3<0.01$.

It is also preferable for the second switch and the third switch to be thin film transistors provided inside a pixel region.

It is also preferable for the second switch to be a thin film transistor provided inside a pixel region, and for the third switch to be a transistor provided outside a pixel region.

It is also preferable for a reference potential line, connecting the second electrode of the data storage capacitor and the reference voltage, to be orthogonal to the second power supply line.

It is also preferable for a reference potential line, connecting the second electrode of the data storage capacitor and the reference voltage, to be orthogonal to the scan direction of the scan lines.

It is also preferable for the data storage capacitance to be larger that a parasitic capacitance, which is a capacitance arising at the gate/source region of the driving capacitor excluding the data holding capacitance.

It is also preferable to compensate for the influence on the write voltage with the variation in power supply voltage by changing the potential of the second electrode of the data storage capacitor between at least a partial period in a pixel selection period and at least a partial period in a pixel non-selection period.

The present invention is also directed to a pixel circuit for a display device in which a plurality of pixels are arranged in a matrix form, including a light emitting element having a first electrode connected to a first power supply and which emits light according to a current flowing in an element, a driving transistor having a source electrode connected to a second power supply and which supplies a drain current to a second electrode of the light emitting element, a data storage capacitor having a first electrode connected to a gate electrode of the driving transistor, and a first switch which is switched ON during a pixel selection period so that data of a data line is written to the data storage capacitor, and wherein a potential of a second electrode of the data storage capacitor is changed between at least a partial period in a pixel selection period and at least a partial period in a pixel non-selection period.

According to the present invention, it is possible to write correct data to a data storage capacitor, even if there is a change in the potential of a second electrode of the data storage capacitor depending on the wiring resistance of power supply lines.

DESCRIPTION OF THE PREFERRED EMBODIMENTS

A pixel circuit and a display device of embodiments of the present invention will now be described based on the drawings. A pixel circuit of this embodiment is shown in FIG. 2A. In FIG. 2A, a P-type driving transistor has been used, but an N-type driving transistor can also be adopted in exactly the same way in the present invention by simply reversing the polarities.

The pixel circuit of the present invention has a structure where a source electrode of the driving transistor $T_{DR}$ is connected to one power supply line (voltage Vdd), a switch SW1 for data voltage writing, and on/off controlled by a scan line 3, is connected to the gate electrode of the driving transistor $T_{DR}$, and one electrode of a data storage capacitor Cs is connected to the gate electrode of the driving transistor $T_{DR}$. The voltage across the gate and source of the driving transistor due to lowering of the power supply line voltage is then compensated for, and pixel current prevented from decreasing, by varying the potential of the other electrode voltage (reference electrode) of the data storage capacitor Cs in accordance with voltage drop of the power supply voltage, between a scan line select period and a scan line non-select period.

Specifically, the switch SW2 is provided, by performing switching with this switch SW2 so as to connect a reference electrode potential for the data storage capacitor Cs to a particular constant potential (in this example, a reference potential Vref of the reference potential line) during a scan line selection period, and connect to a power supply line 5 of lowered voltage (power supply line 5 of an appropriate pixel section lowered in voltage due to the wiring resistance $R_L$) in a scan line non-selection period, the gate electrode potential of the driving transistor $T_{DR}$ is varied in proportion to lowering of voltage due to the wiring resistance $R_L$ of the power supply line 5, and the potential across the gate and source of the driving transistor $T_{DR}$ can be held at the intended voltage.

Figure 1:
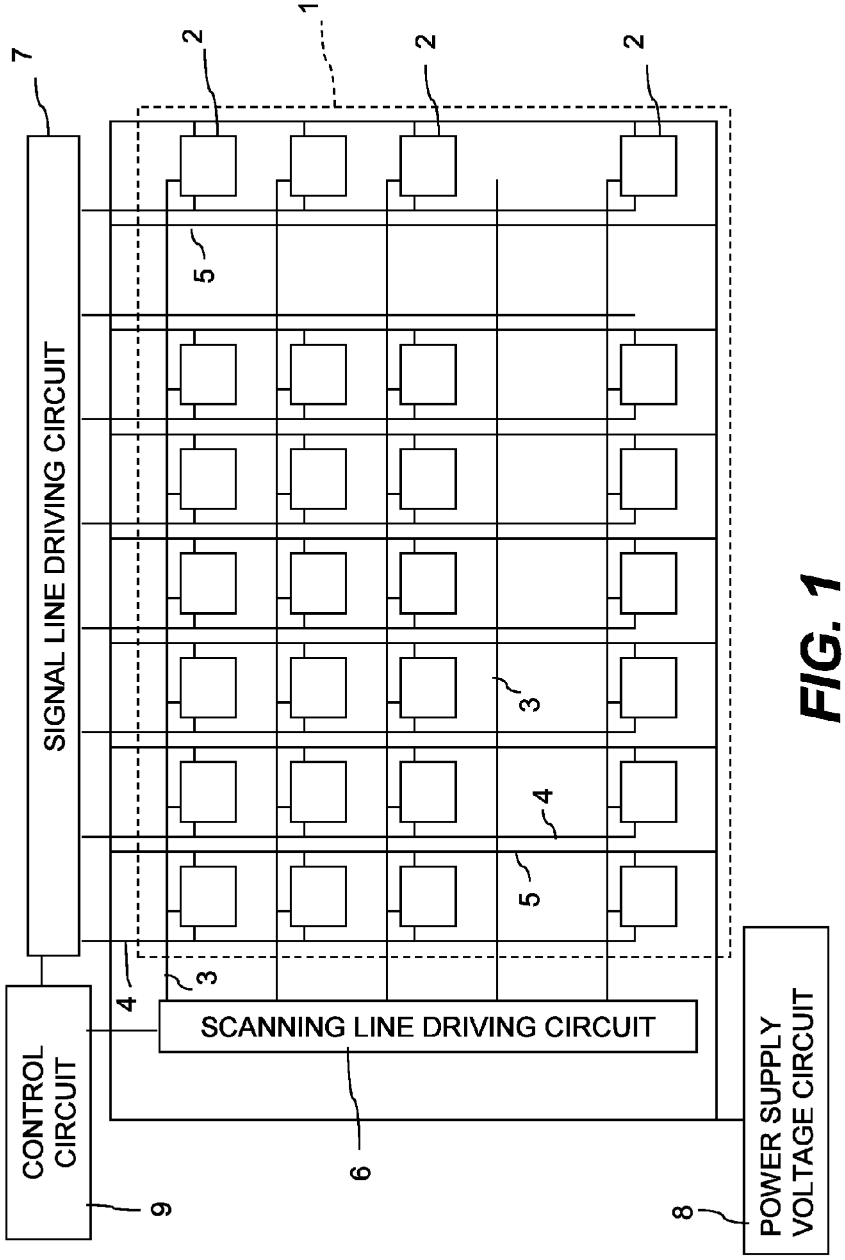
FIG. 1 RELATED ART
FIG. 1 is a drawing showing the overall structure of a display device of the related art.
Figure 2B:
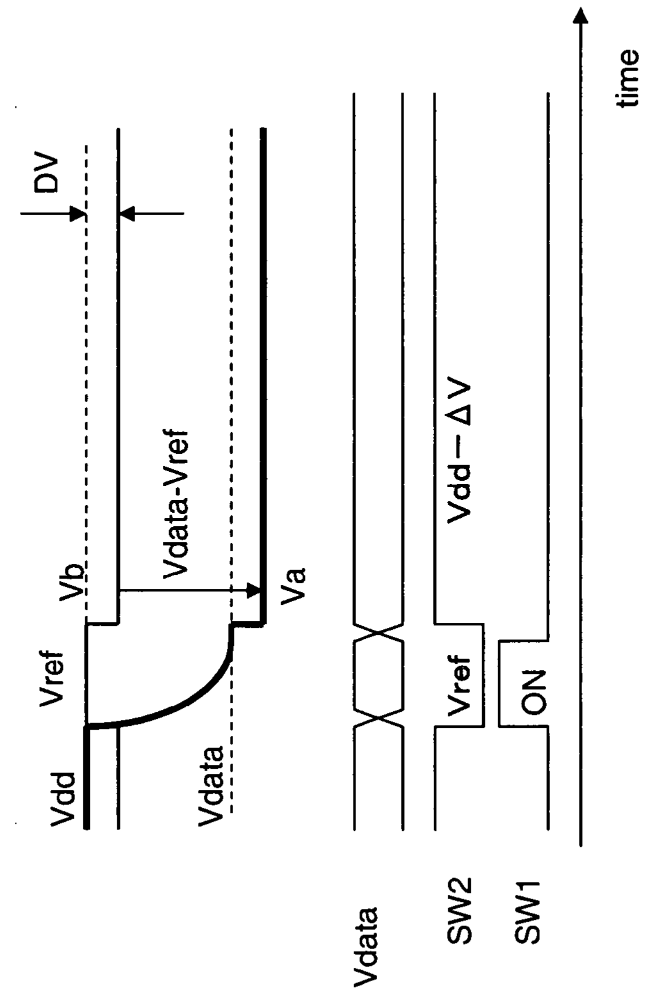
FIG. 2B is a waveform diagram and a timing chart for describing operation.
Figure 2A:
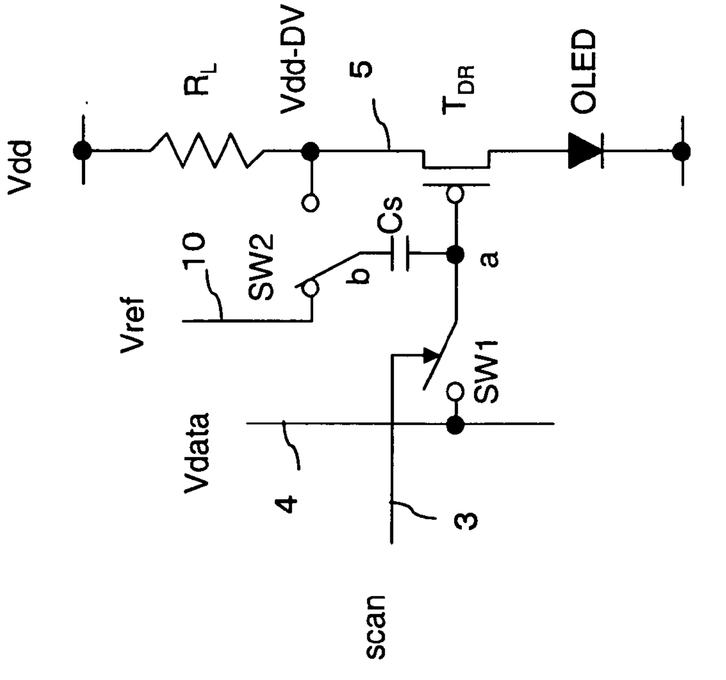
FIG. 2A is a drawing showing the structure of a pixel circuit of an embodiment.

That is, as shown in FIG. 2B, when the switch SW1 is turned on, data of the appropriate pixel is supplied as Vdata. At that time, the switch SW2 selects the reference voltage Vref. Then, after the switch SW1 is turned off, the switch SW2 selects the power supply line 5, namely, Vdd−ΔV.

The pixel control circuit has each pixel formed on a substrate, and the driving transistor $T_{DR}$, switch SW1 and switch SW2 constructed using thin film transistors.

Next, operation of the circuit of FIG. 2 will be described in detail using FIG. 3A and FIG. 3B. In this embodiment also, a P-type driving transistor $T_{DR}$ is assumed, but in the case of an N-type driving transistor also operation becomes exactly the same simply by reversing the polarities.

Specifically, an N-type driving transistor would be arranged at the cathode side of the OLED, and it becomes possible to compensate for lowering of voltage due to the wiring resistance arising between the source electrode and ground of the driving transistor.

Figures 3A, 3B:
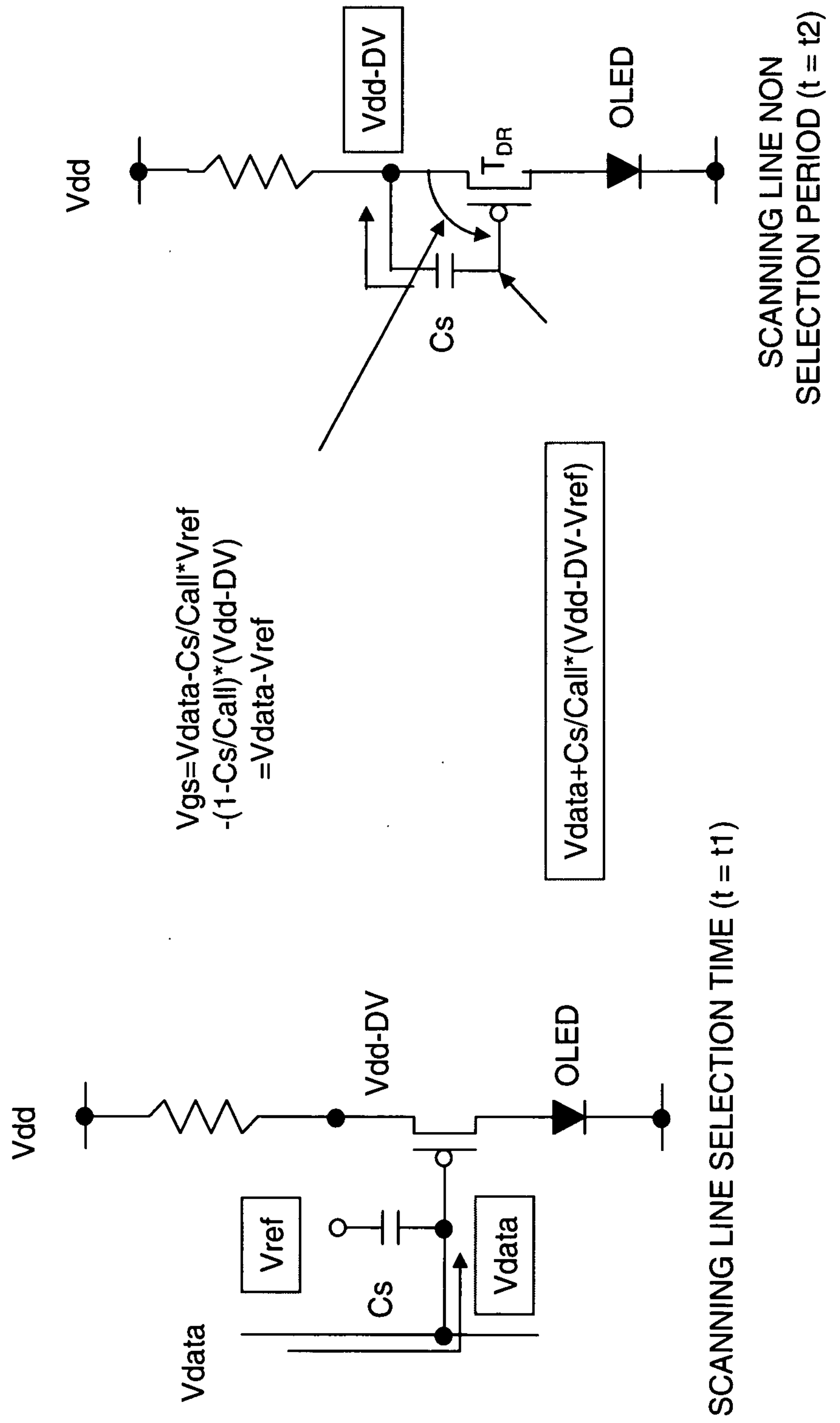
FIG. 3A is a drawing for describing operation at the time of scan line selection.
FIG. 3B is a drawing for describing operation at the time of scan line non-selection.

If a pixel is selected by a scan line 3, as shown in FIG. 3A, the switch SW1 is turned on and a data voltage Vdata is written to the gate (node a) of the driving transistor $T_{DR}$. At that time, the switch SW2 is connected to reference potential Vref, the potential Vb of the source (node b) of the driving transistor $T_{DR}$ becomes Vref, and a voltage (Vdata−Vref) is stored in the data storage capacitor Cs.

After the scan line 3 is de-selected and the switch SW1 is turned off, if the switch SW2 is switched to the power supply line 5 side, as shown in FIG. 3B, potential Vb becomes Vdd−ΔV by subtracting the extend of voltage lowering ΔV from the power supply voltage Vdd. If the overall capacitance around node a is made Call, then the potential Va of node a becomes Va=Vdata+Cs/Call×(Vdd−ΔV−Vref), while the voltage Vgs across the gate and source of the driving transistor $T_{DR}$ becomes Vgs=Vdata−Cs/Call×Vref−(1−CS/Call)×(Vdd−ΔV).

If the data storage capacitor Cs is sufficiently large compared to the parasitic capacitance around node a, it is possible to make Cs=Call, and as shown in FIG. 2B, Vgs becomes equal to Vdata−Vref, and Vgs becomes a value that does not depend on the extent of voltage drop ΔV of the power supply line 5. The drain voltage of the driving transistor $T_{DR}$ is mainly determined by Vgs in the saturation region, which means that it is possible to supply a pixel current to the OLED that corresponds to the desired voltage and is not dependent on the extent of voltage drop ΔV.

The parasitic capacitance around node A cannot be ignored with respect to Cs, and for example, even with Cs about the same as the parasitic capacitance, if Cs=0.5×Call is assumed then Vgs=Vdata−0.5×(Vref+Vdd−ΔV), and the effect of being able to suppress the effect of the voltage drop of the power supply line to half can be expected.

Actually, the switch SW2 does not have to be a physical switch, and various configuration can be considered, as shown in the following specific examples.

SPECIFIC EXAMPLE 1

Figure 4:
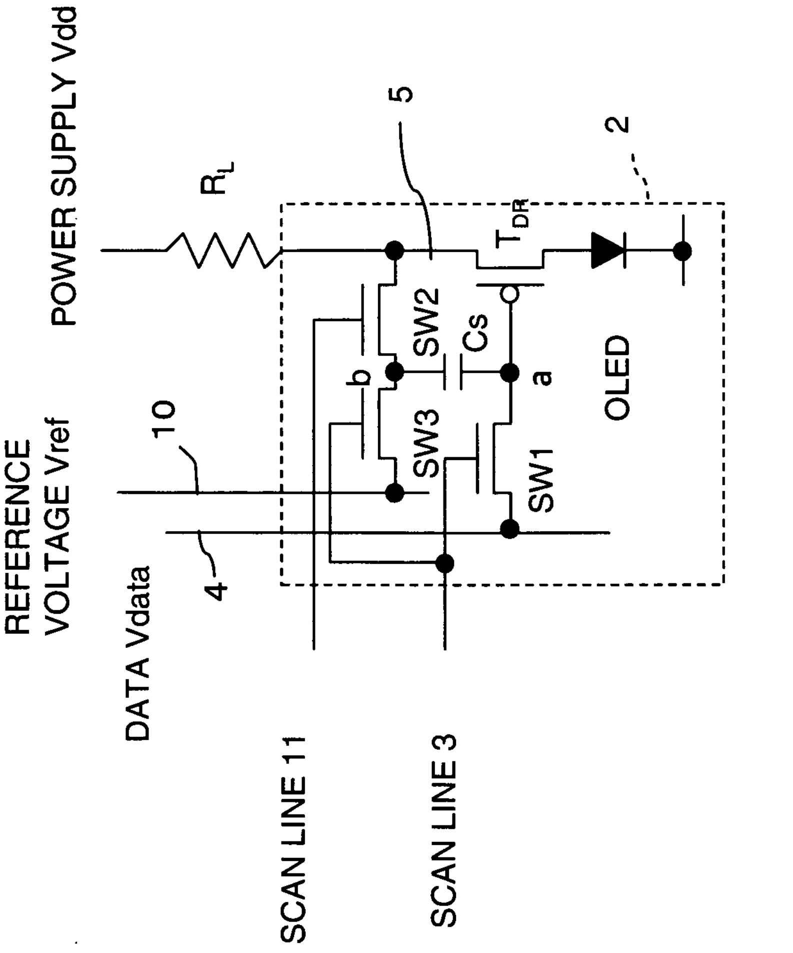
FIG. 4 is a drawing showing a pixel circuit of specific example 1.

FIG. 4 shows the structure of a pixel circuit of specific example 1, and control lines and power supply lines connected to this pixel circuit.

With specific example 1, as well as arranging reference potential lines 10 for supplying the reference voltage Vref to each pixel, scan lines 11 and switches SW3 are also provided in addition to switches SW2. A scan line 11 is set to a select level (H level) at the time of non-selection of a scan line 3 (L level period), with the scan line 3 connected to the gate of switch SW3 and the scan line 11 connected to the gate of switch SW2. In this way, the reference electrode potential for the data storage capacitor Cs is controlled to the reference voltage Vref at the time of data writing, and to the power supply potential Vdd of the power supply line 5 at the time of scan line non-selection. It is also preferable to use thin film transistors for the switches SW2 and SW3.

In FIG. 4, N-type TFTs have been used as the switches SW2 and SW3, but it is also possible to use P-type or a combination of N-type and P-type transistors. Also, switching of the reference electrode potential for the data storage capacitor Cs is preferable carried out after completion of writing the data voltage Vdata to the data storage capacitor Cs.

The voltage Vgs across the gate and source of the driving transistor $T_{DR}$ becomes Vdata−Cs/(Cs+Cp)Vref−Cp/(Cs+Cp)×(Vdd−ΔV), and the effect of the voltage drop ΔV of the power supply line Vdd is reduced by a factor of Cp/(Cs+Cp). Incidentally, Cp is the parasitic capacitance around node a, and Call=Cs+Cp. Accordingly, a capacitance value of the data storage capacitor Cs is preferable made sufficiently large compared to the parasitic capacitance Cp connected around the gate node of the driving transistor.

SPECIFIC EXAMPLE 2

Figure 5:
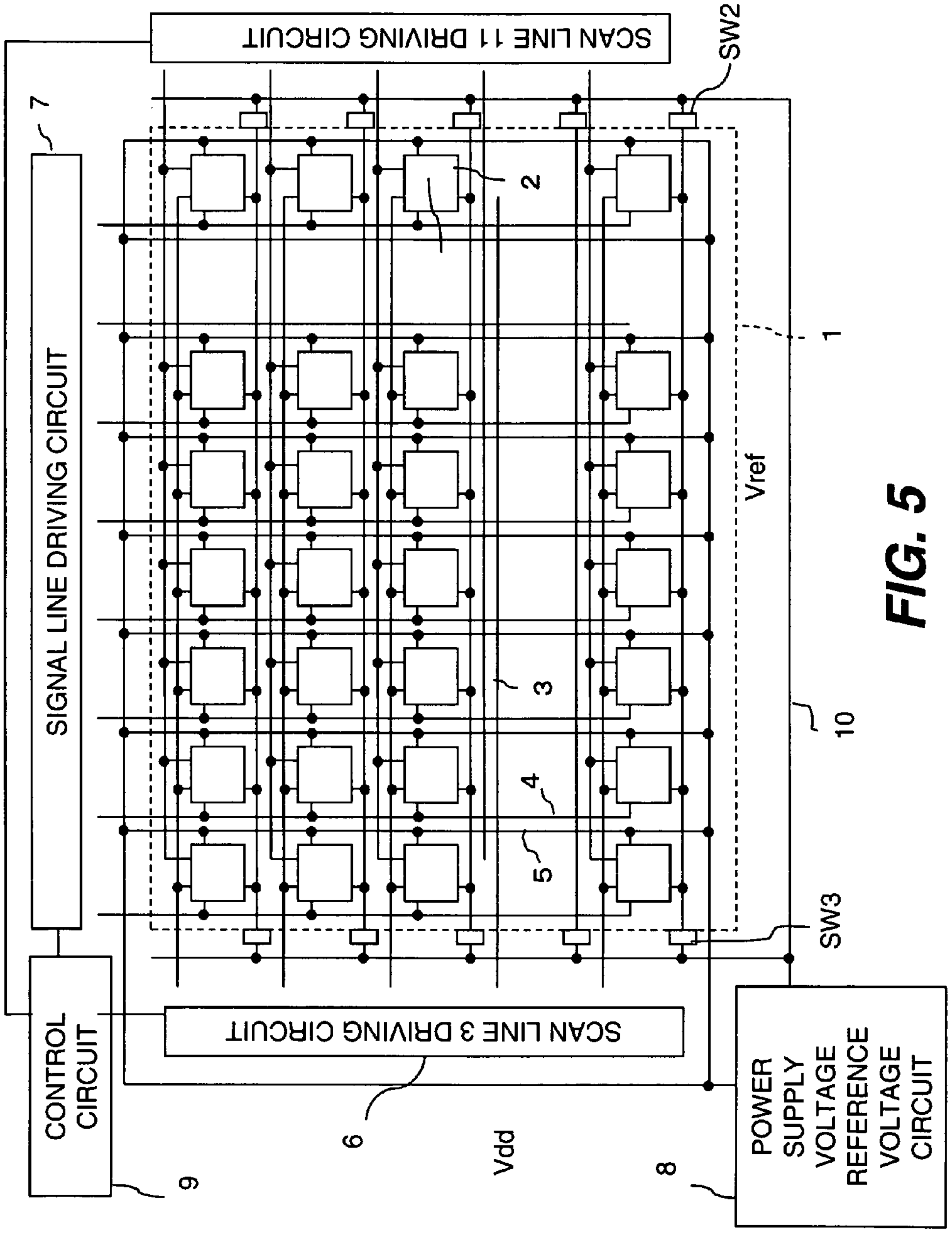
FIG. 5 is a drawing showing the overall structure of specific example 2.
Figure 6:
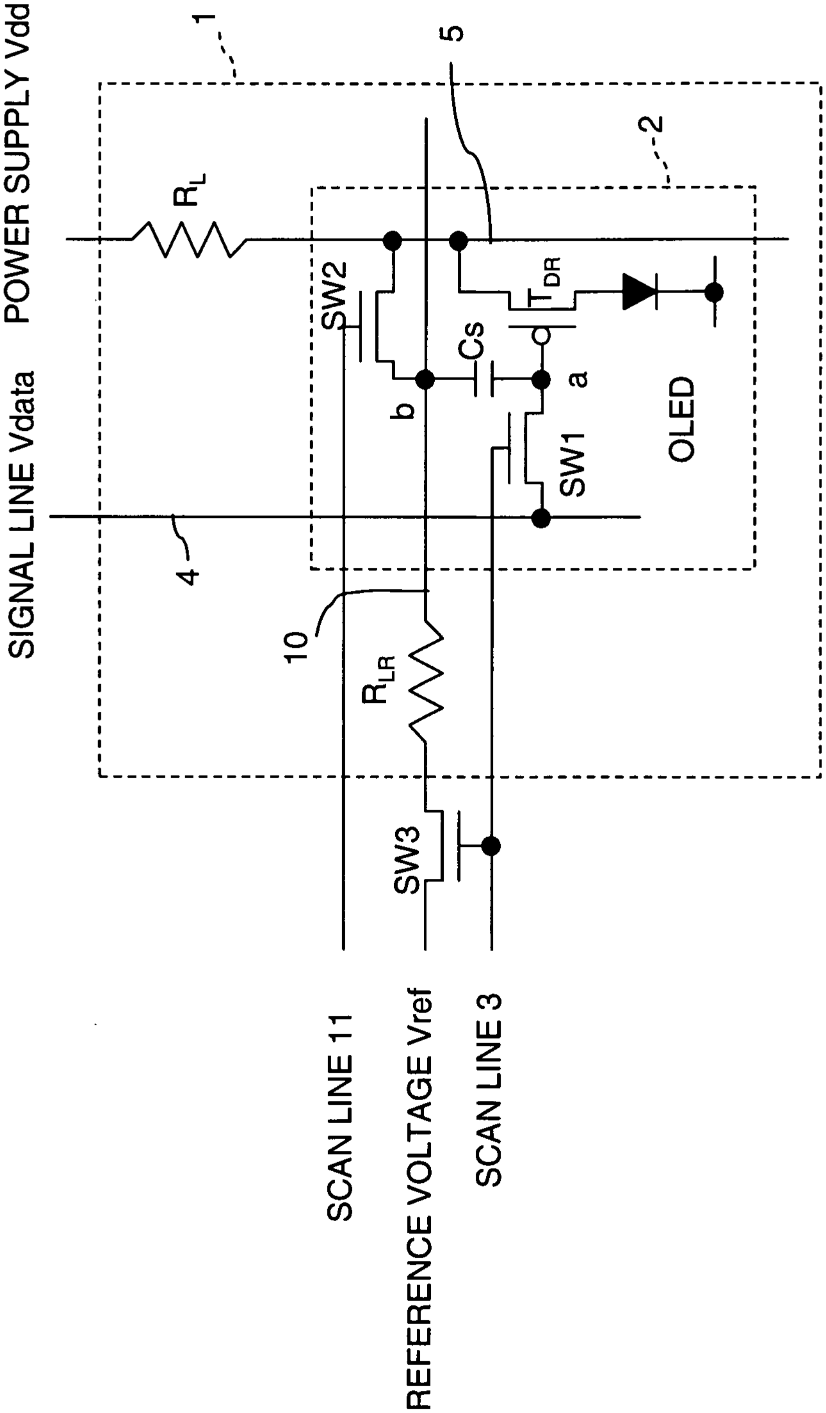
FIG. 6 is a drawing showing a pixel circuit of specific example 2.

FIG. 5 is an overall structural drawing of a display device of specific example 2. FIG. 6 shows a circuit diagram, extracted from a pixel section of specific example 2 and related peripheral sections.

The overall structure of the display device is the same as FIG. 3. The power supply lines Vdd are arranged in the signal line direction while the reference potential lines 10 are arranged in the scanning line direction, and the reference potential electrode of the data storage capacitor Cs is directly connected to the reference potential line 10. The reference potential line 10 is connected via the switch SW3 to the reference potential Vref outside the pixel region 1. The power supply line Vdd and the reference potential line 10 are connected by the switch SW2 inside each pixel.

At the time of data write the scan line 3 is selected, and at the same time the switch SW3 is turned on. At this time switch SW2 is off, and substantially no current flows in the reference potential line 10. As a result, the reference electrode potential Vb of the data storage capacitor Cs is substantially the reference potential Vref(Vb=Vref). Next, after de-selection of the scan line 3, the scan line 11 is selected and the switch SW2 is turned on. The reference electrode potential Vb of the data storage capacitor CS becomes almost the same as the potential Vdd−ΔV of the power supply line Vdd at the pixel connection point, and the potential of the gate node a of the driving transistor $T_{DR}$ is also changed via the data storage capacitance. As a result, the potential Vgs across the gate and source of $T_{DR}$ becomes Vdata−Cs/(Cs+Cp)Vref−Cp/(Cs+Cp)×(Vdd−ΔV). Here, when the data storage capacitor Cs is sufficiently large compared to the parasitic capacitance Cp, the voltage Vgs across the gate and source of $T_{DR}$ becomes the voltage Vgs=Vdata−Vref that is not dependent on the voltage drop of in this pixel. Since the reference potential line 10 uses the power supply voltage Vdd at the time of selection of the scan line 11, the reference potential Vref is preferably the same as the power supply voltage Vdd, or almost the same potential. When the on and off resistances of the switches SW2 and SW3 are respectively made r2on, r2off, r3 on and r3off, they are preferably designed so as to give the following relationship:

$$r2on \times r3on / r2off / r3off < 0.01$$

Here, if a ratio of the on resistance and the off resistance (on resistance/off resistance) of the switch SW2 is represented by R2, and a ratio of the on resistance and the off resistance (on resistance/off resistance) of the switch SW3 is represented by R3, the above equation is represented by R2×R3<0.01.

By setting the on and off resistances in this way, it is possible to set the potential of the reference electrode of the data storage capacitor Cs when the switch SW2 is on to a voltage according to the power supply voltage Vdd, and when the switch SW3 is on set the potential of the reference electrode of the data storage capacitor Cs to the reference potential Vref.

SPECIFIC EXAMPLE 3

Figure 7:
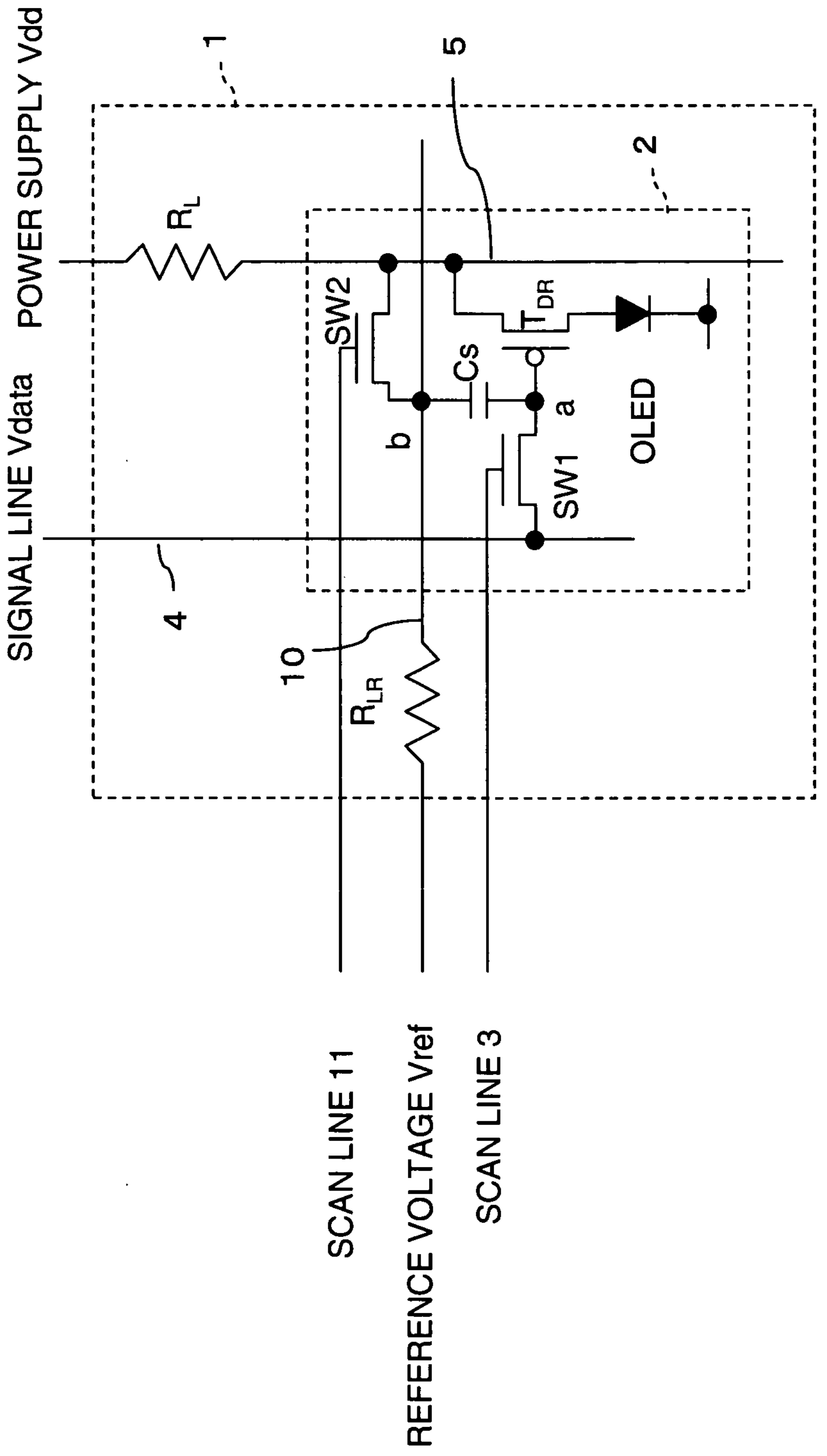
FIG. 7 is a drawing showing a pixel circuit of specific example 3.

FIG. 7 shows the structure of a pixel circuit, control lines and power supply lines of specific example 3. The overall structure of specific example 3 is the same as FIG. 5. The switch SW 3 connecting the reference potential line 10 to the reference voltage Vref in specific example 2 has been removed, and the reference potential line 10 is directly connected to the reference potential Vref. This reference potential line 10 is connected to the reference power supply Vref via a resistance $R_{LR}$. Accordingly, when the switch SW2 is on, the power supply Vdd and the reference power supply Vref are connected via resistance $R_{LR}$ and the on resistance of switch SW2.

In this case, it is preferable to design so that the on resistance r2 on of the switch SW2, with respect to the resistance $R_{LR}$ of the reference potential line 10, becomes as follows:

$$r2on < R_{LR} \times M / 10$$

Also, it is more preferable to further set so that r2on<$R_{LR}$×M/40. By setting these values in this way, it is possible to set so as to switch the potential of the reference electrode of the data storage capacitor Cs when the switch SW2 is on to a voltage corresponding to the power supply voltage Vdd, and to the reference potential Vref. Here, M is the number of pixels in the horizontal direction. In the case of specific example 3, since the switches SW2 are on for all pixels in the horizontal direction, and connected to power supply Vdd, then the resistance to the power supply Vdd becomes substantially smaller as the number of pixels increases. In the case of arranging the reference potential lines 10 in the vertical direction, it is preferable to adopt the number of pixels in the vertical direction for M, or to adopt the number of pixels in the direction having least pixels.

Parts List

1 pixel region
2 unit pixels
3 scan lines
4 signal lines
5 power supply lines
6 line driving circuit
7 line driving circuit
8 power supply voltage circuit
9 control circuit
10 reference potential lines
11 scan lines

The invention claimed is:

1. A display device in which a plurality of pixels are arranged in a matrix form, corresponding to intersections of a plurality of data lines and a plurality of scan lines, wherein each pixel comprises:

a light emitting element having a first electrode connected to a first power supply and which emits light according to a current that flows;

a driving transistor having a source electrode connected to a second power supply and which supplies a drain current to a second electrode of the light emitting element;

a data storage capacitor having a first electrode connected to a gate electrode of the driving transistor; and a first switch which is switched ON during a pixel selection period so that data of a data line is written to the data storage capacitor, and a second switch for controlling a connection between the second power supply and a second electrode of the data storage capacitor, wherein a potential of the second electrode of the data storage capacitor is changed between at least a partial period in the pixel selection period and at least a partial period in a pixel non-selection period, wherein the second electrode of the data storage capacitor and a reference power supply that is different from the second power supply are connected via a resistance, and wherein if a resistance between the data storage capacitor and the reference power supply is made $R_{LR}$, an on resistance of the second switch is made Ron, and a number of pixels, in whichever of the horizontal or vertical direction of the display device has fewer pixels, is made M, $Ron<R_{LR}\times M/40$ is satisfied.

2. The display device of claim 1, further comprising:

a third switch for controlling connection of the second electrode of the data storage capacitor and a reference power supply that is different from the second power supply.

3. The display device of claim 2, wherein:

if on resistance/off resistance, being a ratio of the on resistance to the off resistance of the second switch, is made R2, and on resistance/off resistance, being a ratio of the on resistance to the off resistance of the third switch, is made R3, $R2\times R3<0.01$ is satisfied.

4. The display device of claim 2, wherein:

the second switch and the third switch are thin film transistors provided inside a pixel region.

5. The display device of claim 2, wherein:

the second switch is a thin film transistor provided inside a pixel region, and the third switch is a transistor provided outside a pixel region.

6. The display device of claim 1, wherein:

a reference potential line, connecting the second electrode of the data storage capacitor and the reference voltage, is orthogonal to the second power supply line.

7. The display device of claim 1, wherein:

a reference potential line, connecting the second electrode of the data storage capacitor and the reference voltage, is orthogonal to the scan direction of the scan lines.

8. The display device of claim 1, wherein:

the data storage capacitor is larger than a parasitic capacitance, which is a capacitance arising at the gate node of the driving capacitor excluding the data storage capacitor.

9. The display device of claim 1, wherein:

the influence on the write voltage by the variation in power supply voltage is compensated by changing the potential of the second electrode of the data storage capacitor between at least a partial period in a pixel selection period and at least a partial period in a pixel non-selection period.

10. A pixel circuit for a display device in which a plurality of pixels are arranged in a matrix form, comprising:

a light emitting element having a first electrode connected to a first power supply and which emits light according to a current flowing in an element;

a driving transistor having a source electrode connected to a second power supply and which supplies a drain current to a second electrode of the light emitting element;

a data storage capacitor having a first electrode connected to a gate electrode of the driving transistor; and a first switch which is switched ON during a pixel selection period so that data of a data line is written to the data storage capacitor, and a second switch for controlling a connection between the second power supply and a second electrode of the data storage capacitor, wherein a potential of the second electrode of the data storage capacitor is changed between at least a partial period in the pixel selection period and at least a partial period in a pixel non-selection period, wherein the second electrode of the data storage capacitor and a reference power supply that is different from the second power supply are connected via a resistance, and wherein if a resistance between the data storage capacitor and the reference power supply is made $R_{LR}$, an on resistance of the second switch is made Ron, and a number of pixels, in whichever of the horizontal or vertical direction of the display device has fewer pixels, is made M, $Ron<R_{LR}\times M/40$ is satisfied.

* * * * *